United States Patent [19]

Dauer et al.

[11] Patent Number: 5,578,279
[45] Date of Patent: Nov. 26, 1996

[54] DUAL JET CRYSTALLIZER APPARATUS

[75] Inventors: Richard Dauer, Longmont, Colo.;
Jonathan E. Mokrauer, Westfield;
Walter J. McKeel, Cliffwood Beach,
both of N.J.

[73] Assignee: Merck & Co., Inc., Rahway, N.J.

[21] Appl. No.: 411,614

[22] PCT Filed: Sep. 29, 1993

[86] PCT No.: PCT/US93/09268

§ 371 Date: Jun. 5, 1995

§ 102(e) Date: Jun. 5, 1995

[87] PCT Pub. No.: WO94/07582

PCT Pub. Date: Apr. 14, 1994

[51] Int. Cl.⁶ ............................................. B01D 9/00
[52] U.S. Cl. ...................... 422/245.1; 23/295 R; 117/206
[58] Field of Search .................... 23/295 R; 117/200,
117/206; 118/715, 725, 729; 422/245.1,
257

[56] References Cited

U.S. PATENT DOCUMENTS

| | | | |
|---|---|---|---|
| 2,751,335 | 6/1956 | Carver et al. | 208/203 |
| 3,622,496 | 11/1971 | Biribauer et al. | 208/35 |
| 3,668,145 | 6/1972 | Belter et al. | 422/150 |
| 3,788,479 | 1/1974 | Szakasits | 422/78 |
| 3,918,916 | 11/1975 | Garrett | 422/245.1 |
| 3,966,416 | 6/1976 | Tranchart et al. | 117/221 |
| 4,047,184 | 9/1977 | Bassous et al. | 347/76 |
| 4,221,754 | 9/1980 | Nowak | 117/30 |
| 4,327,059 | 4/1982 | Fujimura et al. | 422/259 |
| 4,567,912 | 2/1986 | Levine | 137/606 |
| 4,588,562 | 5/1986 | Saitoh et al. | 422/245.1 |
| 4,663,433 | 5/1987 | Pyles et al. | 528/496 |
| 4,783,008 | 11/1988 | Ikeuchi et al. | 239/421 |
| 4,915,302 | 4/1990 | Kraus et al. | 239/14.2 |
| 4,952,224 | 8/1990 | Lilakos | 62/534 |
| 5,011,293 | 4/1991 | Roop et al. | 366/162.4 |
| 5,074,671 | 12/1991 | Roueche et al. | 366/172.1 |
| 5,314,506 | 5/1994 | Midler et al. | 23/295 R |

FOREIGN PATENT DOCUMENTS

| | | |
|---|---|---|
| 0393963 | 10/1980 | European Pat. Off. |
| 0157562 | 10/1985 | European Pat. Off. |
| 0344898 | 12/1989 | European Pat. Off. |
| 3126854 | 1/1983 | Germany |

OTHER PUBLICATIONS

Pohorecki et al., "The use of a new model of micromixing for determination of crystal size in precipitation", Chem. Eng. Sci., vol. 38, pp. 79–83 (1983).

Garside et al., "Mixing, reaction and precipitation: Limits of micromixing in an MSMPR crystallizer", Chem. Eng. Sci., vol. 40, pp. 1485–1493 (1985).

(List continued on next page.)

*Primary Examiner*—R. Bruce Breneman
*Assistant Examiner*—FeLisa Garrett
*Attorney, Agent, or Firm*—Catherine D. Fitch; Melvin Winokur

[57] ABSTRACT

There is disclosed a dual jet crystallizer apparatus comprising a crystallization or mixing chamber having opposed angularly disposed arms which removably receive jet nozzles. One end of the chamber is provided with means to discharge crystallized product therefrom while the other end is equipped with means to adjust the crystallization volume within the chamber. The angular arms are disposed within specified angular tolerances with respect to the longitudinal axis of the chamber. One of the jet nozzles is provided with means at one end to receive and deliver to the chamber compound to be crystallized while one end of the other jet nozzle is provided with means to receive and deliver to the chamber a crystallization agent for the compound. The opposite ends of each of the jet nozzles have means to removably secure them to the angular arms and the ends thus secured have a nozzle tip section formed therein defining an orefice having an elongated bore. Means are provided intermediate the ends of each jet nozzle for further adjusting the distance of the jet nozzle tips with respect to the longitudinal axis of the chamber.

5 Claims, 2 Drawing Sheets

OTHER PUBLICATIONS

Mersmann et al., "Chemical Engineering Aspects of Precipitation fromSolution", Chem. Eng. Technol., vol. 11, pp. 264–276 (1988).

Midler et al., "Production of high surface area, low defect organic crystals", Ann. Meeting Amer. Inst. Chem. Eng., (1989).

Liu et al., "The use of continually impinging jets to control crystallization and particle size in pharmaceutical manufacturing", Abstract of American Institute of Chemical Engineers 1990 Annual Meeting, No. 66B.

Mahajan et al., "Rapid precipitation of amino acids", Extended Abstracts, American Institute of Chemical Engineers, 1991 Annual Meeting, No. 74e (1991).

DUAL JET CRYSTALLIZER APPARATUS

BACKGROUND OF THE INVENTION

Crystallization from solution of chemically active compounds or their intermediates is the typical method of purification used in industry, particularly the pharmaceutical industry. The integrity of the crystalline structure, or crystal habit, that is produced and the particle size of the end product are important considerations in the crystallization process.

For pharmaceuticals, high bioavailability and short dissolution time are desirable or often necessary attributes of the end product. However, the direct crystallization of small sized, high surface area particles is usually accomplished in a high supersaturation environment which often results in material of low purity, high friability, and decreased stability due to poor crystal structure formation. Because the bonding forces in organic crystal lattices generate a much higher frequency of amorphism than those found in highly ionic, inorganic solids, "oiling out" of supersaturated material is not uncommon, and such oils often solidify without structure.

Slow crystallization is a common technique used to increase product purity and produce a more stable crystal structure, but it is a process that decreases crystallizer productivity and produces large, low surface area particles that require subsequent high intensity milling. Currently, pharmaceutical compounds almost always require a post-crystallization milling step to increase particle surface area and thereby improve their bioavailability. However, high energy milling has drawbacks. For example, such milling may result in yield loss, noise and dusting, as well as unwanted personnel exposure to highly potent pharmaceutical compounds. Also, stresses generated on crystal surfaces during milling can adversely affect labile compounds. Overall, the three most desirable end-product goals of high surface area, high chemical purity, and high stability cannot be obtained using current crystallization technology.

One standard crystallization procedure involves contacting a supersaturated solution of the compound to be crystallized with an appropriate "anti-solvent" in a stirred vessel. Within the stirred vessel, the anti-solvent initiates primary nucleation which leads to crystal formation and crystal digestion during an aging step. Mixing within the vessel can be achieved with a variety of agitators (e.g., Rushton or pitched blade turbines, Intermig, etc.), and the process is done in a batchwise fashion.

When using current reverse addition technology for direct small particle crystallization, a concentration gradient can not be avoided during initial crystal formation because the introduction of feed solution to anti-solvent in the stirred vessel does not afford a thorough mixing of the two fluids prior to crystal formation. The existence of concentration gradients, and therefore a heterogeneous fluid environment at the point of initial crystal formation, impedes optimum crystal structure formation and increases impurity entrainment. If a slow crystallization technique is employed, more thorough mixing of the fluids can be attained prior to crystal formation which will improve crystal structure and purity, but the crystals produced will be large and milling will be necessary to meet pharmaceutical industry bioavailability requirements.

Another standard crystallization procedure employs temperature variation of a solution of the material to be crystallized in order to bring the solution to its supersaturation point, but this is a slow process that produces large crystals. Despite the elimination of a solvent gradient with this procedure, the resulting crystal characteristics of size, purity and stability are difficult to control and are inconsistent from batch to batch.

Impinging jets are routinely used for micromixing in reaction injection moulding (RIM) technology in the plastics industry, but not for the purpose of causing crystallization. The use of an impinging jet device in a crystallization process to achieve intense micromixing is novel. Whether feed material is relatively pure or impure, the use of impinging jets results in crystal characteristics superior to those that result from standard crystallization methods.

SUMMARY OF THE INVENTION

Now with the present invention there is provided an apparatus for direct and immediate crystallization of pharmaceutical and other chemical compounds or their intermediates which directly produces high surface area end product crystals with greatly improved stability, purity and uniformity thereby eliminating the need for subsequent high intensity milling to meet bioavailability requirements. By removing the need for milling, the novel dual jet crystallizer apparatus of the invention avoids associated problems of noise and dust, cuts yield loss, and saves the time and extra expense incurred during milling. Importantly, it also eliminates personnel contact with highly potent chemical or pharmaceutical agents, or with adverse effects from labile compounds. The particle sizes attainable with the dual jet crystallization apparatus are consistent within a single run and results are reproducible between runs. Reproducibility is an attribute of the apparatus of this invention that is not common to "reverse addition" methods typically used to produce small crystals.

The pure, high surface area particles produced by the dual jet crystallizer apparatus of the invention display superior crystal structure when compared to particles formed from standard slow crystallization plus milling methods using the same quality and kind of feed compound. Improvements in crystal structure result in decreases in decomposition rate and therefore longer shelf-life for the crystallized product or a pharmaceutical composition containing the crystallized material.

The purity of crystallized material produced by the dual jet apparatus of the invention is superior to that from standard reverse addition direct small particle crystallization. Standard slow batch crystallization affords product purity comparable to that afforded by the dual jet apparatus of the invention, but the jet apparatus of the invention is superior because, in addition to high purity, it also provides higher quality crystal habit and increased particle surface area thereby eliminating the need for milling.

Importantly, the dual jet crystallizer apparatus of the invention is suited for continuous processing. Standard crystallization methods are generally run in a batchwise fashion. Continuous processing affords two advantages: first, the same amount of compound supplied to the apparatus can be crystallized in significantly less volume by continuous processing than would be possible by using a batch method; second, continuous processing enhances reproducibility of results because all the material crystallizes under uniform conditions. Such uniformity is not possible using batch methods in which supersaturation, solubility and other parameters change with time.

Thus, regardless of the product to be produced, the dual jet crystallizer apparatus of the invention enables one to not only obtain reproducible, uniform crystals, but crystals that have a geometric elegance that were heretofore unattainable with any other method or apparatus.

In general, the dual jet crystallizer apparatus of the invention comprises: a generally tubular crystallization and mixing chamber open at each end and having a pair of opposed angularly disposed arms intermediate its ends which are adapted to removably receive, a jet nozzle therein; means at one end of said chamber to adjust the crystallization volume therewithin; means at the other end of said chamber to discharge crystallized product formed therein; a pair of jet nozzles adapted at one end to be removably secured to said arms, each of said one ends of said jet nozzles having a jet nozzle tip formed therein defining a nozzle tip orifice having an elongated bore, the opposite ends of said jet nozzles having means to receive and deliver to said chamber compound to be crystallized and means to receive and deliver to said chamber a crystallizing agent for said compound; and, means intermediate the ends of each of said jet nozzles to adjust the distance of said jet nozzle tips with respect to the longitudinal axis of said crystallization chamber.

The angular disposition of the arms on the crystallization chamber is such that the angle included by the longitudinal axis of each arm and the longitudinal axis of the crystallization chamber is from about 60° to about 80°, preferably from about 70° to about 80°.

The end of each jet nozzle that is removably secured to the angular arms is provided with a jet nozzle tip formed therein that defines a jet nozzle tip orifice having an elongated bore. The diameter of the jet nozzle tip orifice is preferably sized to be from about 1/16" to about 3/8" and the length of its elongated bore should be no more than about 10 times the diameter of the orifice. Within these parameters, jet nozzles having jet nozzle tip orifices of different diameters can be provided to crystallize numerous and various types of compounds. Thus, in order to prepare the crystallization chamber for crystallizing a different compound, only the jet nozzles need be replaced.

It will be appreciated that by being able to interchange the jet nozzles coupled with controlling the supply flow rates of the compound to be crystallized and its crystallizing agent, a degree of flexibility is afforded that has not been available before. These benefits, considered with those discussed hereinabove, result in providing a dual jet crystallizer apparatus that is safe, economical and flexible.

DETAILED DESCRIPTION OF THE INVENTION

The dual jet crystallizer apparatus and preferred embodiments thereof will become more apparent from the ensuing description when considered together with the accompanying drawing wherein like reference numerals identify like parts and wherein.

Figure 1:
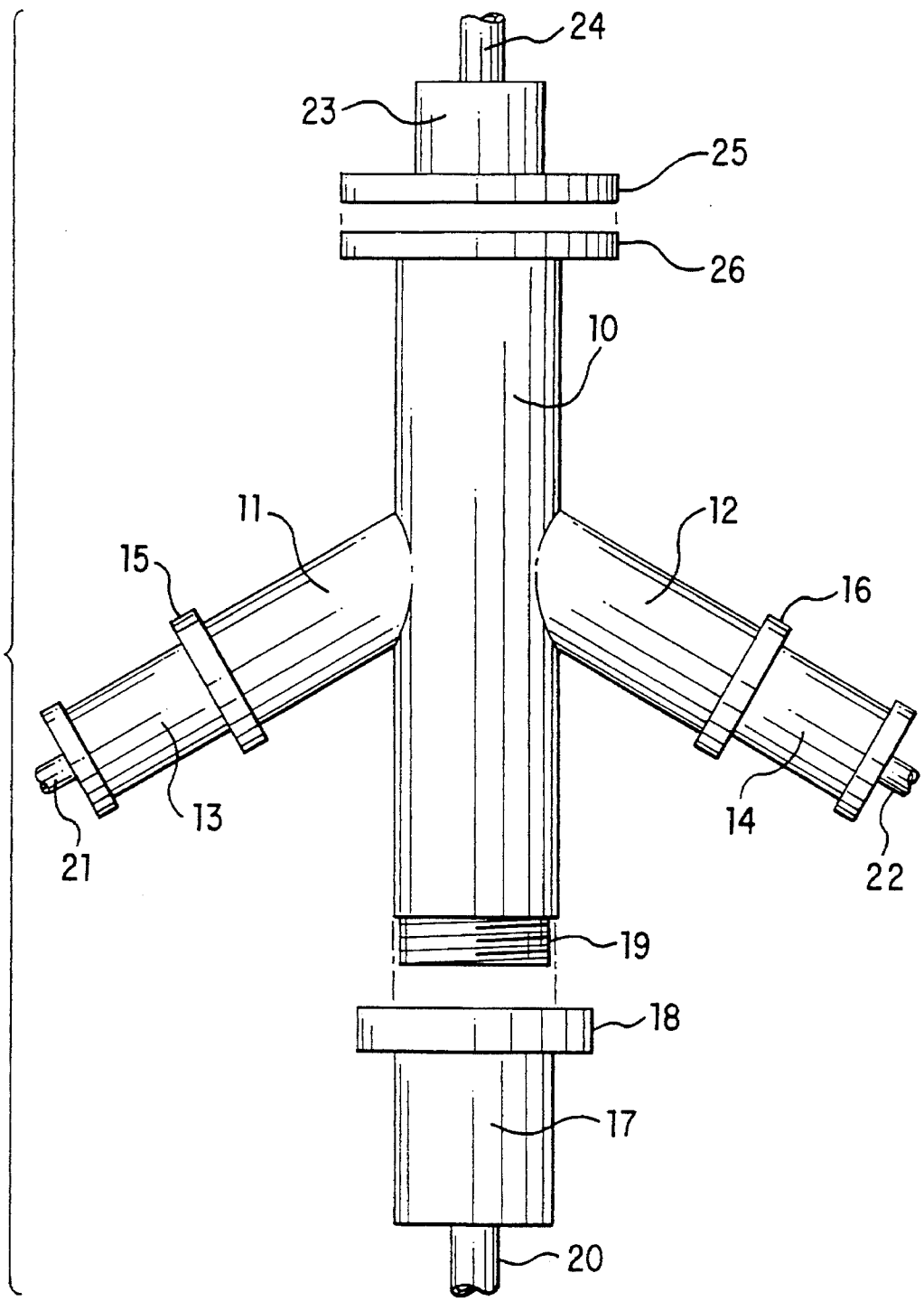
FIG. 1 is an exploded elevation view of the dual jet crystallizer apparatus of the invention.

As illustrated in FIG. 1, the dual jet crystallizer apparatus of the invention comprises a generally tubular crystallization and mixing chamber 10 open at each end and having angularly opposed tubular arms 11, 12 intermediate the ends of chamber 10 which are adapted to removably receive jet nozzles 13 and 14. Jet nozzles 13 and 14 can be removably secured to arms 11 and 12 by any suitable means such as internally threaded collars 15 and 16 which can be screwed onto external threads (not shown) provided on the ends of arms 11 and 12.

The angle included by the longitudinal axis of each of the arms 11 and 12 and the longitudinal axis of crystallization chamber 10 should be from about 60° to 80°, preferably from about 70° to about 80°. At angles of more than about 80°, it was found that the compound to be crystallized and its crystallizing agent would not impact each other and crystallize, but would flow into each other and not be discharged. At angles of less than about 60°, it was found that although crystallized product could be obtained, the resulting crystals were non-uniform.

The crystallization space; i.e., crystallization volume, within crystallization chamber 10 is adjusted by means of piston 17 which is sized to be slidably received within one end of crystallization chamber 10. Piston 17 is secured to crystallization chamber 10 by means of internally threaded collar 18 which is screwed onto external threads 19 at the lower end of crystallization chamber 10. The exposed end of piston 17 is fitted with a piston rod 20 which can be driven by conventional means such as a pneumatic pump and appropriately connected pneumatic lines (not shown).

The size of a typical crystallization chamber 10 is one having a diameter of from about ¾" to about 1½" and a length of from about 6½" to about 7½".

Compound to be crystallized in crystallization chamber 10 is supplied from a supply source through one jet nozzle, such as 13, by means of a suitable product feed line 21 while a suitable crystallizing agent is similarly supplied through the other jet nozzle 14 by means of a suitable crystallizing agent feed line 22.

Crystallized product is discharged from the other end of crystallization chamber 10 through discharge tube 23 and delivered to a suitable receptacle by means of delivery conduit 24 communicating with and secured to the outlet end of discharge tube 23. Discharge tube 23 can be secured to communicate with the outlet end of crystallization chamber 10 by any suitable means such as by securing discharge tube flange 25 to flange 26 fitted to the outlet end of chamber 10 by conventional means such as by bolting flanges 25 and 26 together.

Figure 2:
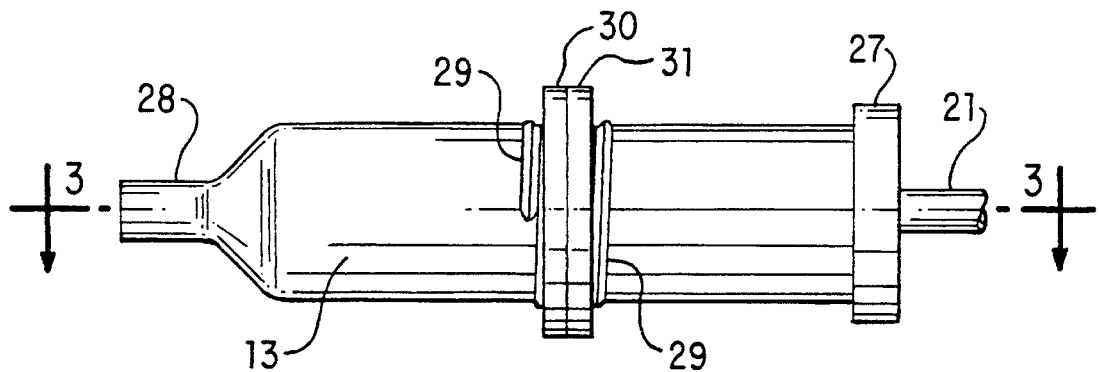
FIG. 2 is a side view of one of the dual jet nozzles of the crystallizer.
Figure 3:
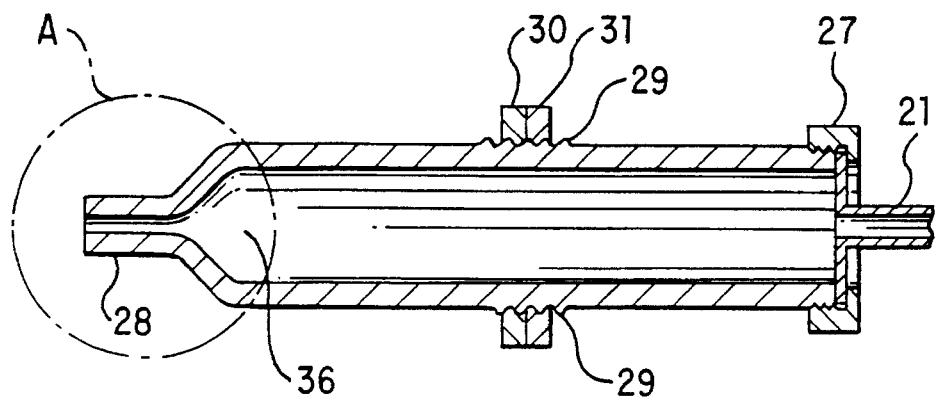
FIG. 3 is a view taken substantially on line 3—3 of FIG. 2.
Figure 4:
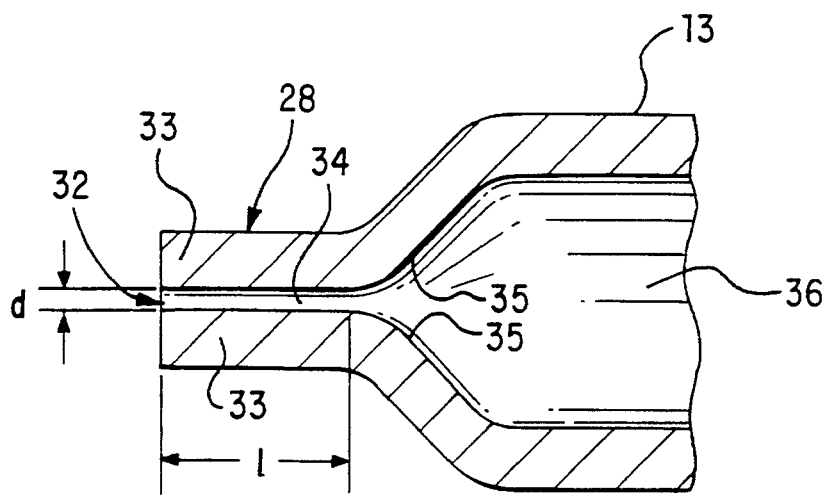
FIG. 4 is an enlarged sectional view of the area identified by circle A showing details of the jet nozzle tip.

Details of both of the jet nozzles of the invention are shown in FIGS. 2–4 using jet nozzle 13 for purposes of illustration. As can be seen, the supply end of jet nozzle 13 is secured to feed line 21 by means of adapter nut 27 which is screwed onto jet nozzle 13 while the other end of jet nozzle 13 terminates in a nozzle tip section 28.

Intermediate its ends, jet nozzle 13 is provided with external circumferential threads 29 which carry a pair of adjusting washers 30, 31. By manipulating the adjusting washers 30, 31 along external threads 29 toward or away from nozzle tip section 28, the distance of nozzle tip section 28 can be further adjusted with respect to the longitudinal axis of crystallization chamber 10 as can the distance between the nozzle tip sections of each jet nozzle.

When the distance between the nozzle tip sections is adjusted to be closer together, a smaller cross-sectional area of impact between a compound and its crystallizing agent is created. When the distance between the nozzle tip sections is adjusted to be farther apart, a larger cross-sectional area of impact between a compound and its crystallization agent is created. This cross-sectional area of impact is referred to as the micromixing volume. Thus, when the micromixing volume is decreased, more intense and faster mixing of a compound and its crystallization agent occurs resulting in crystallized product having a more uniform particle size. Consequently, both the rate of crystallization and the particle size of the resulting crystals can be optimized for a particular product.

The configuration of the nozzle tip orifice 32 is defined by the land 33 within the nozzle tip section 28 as shown in FIG. 4. In the embodiment illustrated in FIG. 4, land 33 defines an orifice 32 having an elongated uniform bore 34 that terminates in a flared section 35 where it enters the body 36 of jet nozzle 13.

If "d" represents the diameter of orifice 32 and "l" represents the length of bore 34, the length of bore 34 should preferably be no greater than about 10 times the diameter of orifice 32. Thus, if "d" (i.e., the diameter of orifice 32) is ⅛", then "l" (i.e., the length of bore 34) should be no greater than about 1¼". In a preferred embodiment, the diameter of orifice 32 is from about 1/16" to about ⅜".

Assuming that the supply of the compound to be crystallized and its crystallization agent are delivered at uniform flow rates, it will be apparent that using an orifice 32 of relatively small diameter will result in increased velocity of both the compound and its crystallization agent. Flow rates dictate the kinetics of crystallization; i.e., particle size and uniformity, so that faster flow rates of compound and its crystallization agent will result in faster crystallization and smaller particles. Thus, the faster a compound and its crystallization agent mix and impact, the faster they will reach a uniform environment and composition and yield more uniformly sized crystallized product.

As an example of a typical crystallization operation using the apparatus of the invention, jet nozzles 13, 14 were selected whose nozzle tip orifices 32 had a diameter of 9/64" for the compound and a diameter of 9/32" for the crystallizing agent. The included angle of angular arms 11, 12 was 76°. Compound comprising a solution of finasteride, acetic acid and water was supplied to nozzle 13 through feed line 21 at a rate of 5 L per minute. Crystallizing agent—in this instance, water—was supplied to nozzle 14 through feed line 22 at a rate of 27 L per minute. Product was instantly crystallized and discharged through discharge tube 23 and delivered to a suitable receptacle via delivery conduit 24. The average particle size of the recovered crystalline product was 10–15 μm in the form of hexagonal flakes.

Since the jet nozzles of the dual jet crystallizer apparatus are removable, they can be replaced with jet nozzles having the desired orifice diameters for crystallizing a particular product. This jet nozzle selection coupled with the ability to fine tune the micromixing volume of a compound and its crystallizing agent offers the user a degree of flexibility that has not been heretofore available to quickly crystallize a wide variety compounds that are recovered in the form of uniform crystals.

Although the dual jet crystallizer apparatus of the invention can be fabricated from any suitable plastic or metal or combinations thereof, stainless steel is preferred as it can be machined to close tolerances, is non-corrosive and durable and can be readily cleaned, including sterilization. Thus, while the invention has been described with particularity and in some detail, it will be apparent to those skilled in this art that changes and modifications can be made therein without departing from the scope of the invention recited in the claims.

What is claimed is:

1. A dual jet crystallizer apparatus comprising:

(a) a tubular crystallization and mixing chamber having a first end and a second end and being open at each end, and having a pair of opposed tubular arms intermediate its ends, each of said arms being angularly disposed such that the angle included by the longitudinal axis of each of said arms and the longitudinal axis of said chamber is from about 60° to about 80°, the open ends of each of said arms having means to removably receive a jet nozzle therein;

(b) means at the first end of said chamber to adjust the crystallization volume within said chamber;

(c) means at the second end of said chamber to discharge crystallized product formed in said chamber;

(d) a pair of jet nozzles adapted to be removably secured to said arms, that end of each of said jet nozzles secured to said arms having a jet nozzle tip formed therein defining a nozzle tip orifice, having a diameter being from about 1/16" to about ⅜" and having an elongated bore, the length of said bore being no greater than about 10 times said diameter, the opposite end of one of said jet nozzles having means to receive and deliver compound to said chamber to be crystallized and the opposite end of the other jet nozzle having means to receive and deliver to said chamber a crystallizing agent for said compound; and, (e) means intermediate the ends of said jet nozzles to adjust the distance between said jet nozzle tips and the longitudinal axis of said chamber.

2. The dual jet crystallizer apparatus of claim 1 wherein the included angle formed by the longitudinal axis of each of said arms with the longitudinal axis of said chamber is from about 70° to about 80°.

3. The dual jet crystallizer apparatus of claim 1 wherein said volume adjusting means is a piston sized to be slidably received within said chamber.

4. The dual jet crystallizer apparatus of claim 1 wherein said distance adjusting means on said jet nozzles is provided by a pair of adjusting washers threadably secured to the outer circumference of each of said jet nozzles.

5. A dual jet crystallizer apparatus comprising (a) a tubular crystallization and mixing chamber having a first end and a second end and being open at each end and having a pair of opposed tubular arms intermediate its ends, said arms being angularly disposed such that the angle included by the longitudinal axis of each of said arms and the longitudinal axis of said chamber is from about 70° to about 80°, the open end of each of said arms having means to removably receive a jet nozzle therein;

(b) a piston sized to be slidably received within said chamber at the first end thereof to adjust the crystallization volume within said chamber;

(c) means at the second end of said chamber to discharge crystallized product formed in said chamber;

(d) a pair of jet nozzles adapted to be removably secured to said arms, that end of each of said jet nozzles secured to said arms having a jet nozzle tip formed therein defining a nozzle tip orifice, having a diameter being from about 1/16" to about ⅜" and having an elongated bore, the length of said bore being no greater than about 10 times said diameter, the opposite end of one of said jet nozzles having means to receive and deliver to said chamber compound to be crystallized, and the opposite end of the other jet nozzle having means to receive and deliver to said chamber a crystallizing agent for said compound; and, (e) a pair of adjusting washers threadably secured to the outer circumference of each of said jet nozzles to adjust the distance between each of said jet nozzle tips and the longitudinal axis of said chamber.

* * * * *

UNITED STATES PATENT AND TRADEMARK OFFICE
CERTIFICATE OF CORRECTION

PATENT NO. : 5,578,279
DATED : November 26, 1996
INVENTOR(S) : Richard Dauer, et. al.

It is certified that error appears in the above-indentified patent and that said Letters Patent is hereby corrected as shown below:

On the Title page, item [63] insert-- Related U. S. Application Data Continuation of Ser. No. 957,314, Oct 6, 1992 abandoned--

Column 1, following "DUAL JET CRYSTALLIZER APPARATUS" insert--Cross Reference to Related Applications, This is a national phase application of PCT/US93/09268 filed Sept. 29, 1993, which is a continuation of U.S. SN 957,314, filed Oct. 6, 1992, abandoned--.

Signed and Sealed this

First Day of July, 1997

*Attest:*

BRUCE LEHMAN

*Attesting Officer*   Commissioner of Patents and Trademarks